United States Patent [19]

Numazawa et al.

[11] 4,345,904
[45] Aug. 24, 1982

[54] CHAIN DRIVE ASSEMBLY

[75] Inventors: Akio Numazawa, Nagoya; Yutaka Taga; Masayoshi Funato, both of Toyota, all of Japan

[73] Assignee: Toyota Jidosha Kogyo Kabushiki Kaisha, Toyota, Japan

[21] Appl. No.: 273,319

[22] Filed: Jun. 15, 1981

Related U.S. Application Data

[63] Continuation of Ser. No. 44,186, May 31, 1979, abandoned.

[30] Foreign Application Priority Data

Apr. 9, 1979 [JP] Japan ................... 54-41980

[51] Int. Cl.³ ............................................. F16G 13/04
[52] U.S. Cl. .................................... 474/215; 474/220
[58] Field of Search ........................... 474/156–157, 474/212–218, 223, 229, 220

[56] References Cited

U.S. PATENT DOCUMENTS

| | | | |
|---|---|---|---|
| 1,004,389 | 9/1911 | Dodge | 474/213 |
| 1,259,028 | 3/1918 | Layman | 474/213 |
| 1,268,254 | 6/1918 | Layman | 474/213 |
| 1,352,017 | 9/1920 | Morse | 474/213 |
| 1,704,279 | 3/1929 | Breer | 474/213 |
| 1,727,129 | 9/1929 | Morse | 474/220 |
| 3,877,688 | 4/1975 | McCarty | 474/220 |

FOREIGN PATENT DOCUMENTS 641582 4/1928 France .
23997 of 1897 United Kingdom ............... 474/220

*Primary Examiner*—Lawrence J. Staab
*Attorney, Agent, or Firm*—Finnegan, Henderson, Farabow

[57] ABSTRACT

There are provided means for pressing link plates constituting a chain drive assembly in the axial direction of pins, whereby a clearance between the link plates arranged adjacent to each other in the transverse direction of the chain assembly is eliminated, and in turn, a frictional resistance between the link plates is increased. Oscillation of the chain stringer is thus suppressed, and hence a noise due to such oscillation is eliminated.

16 Claims, 19 Drawing Figures

F I G. 14
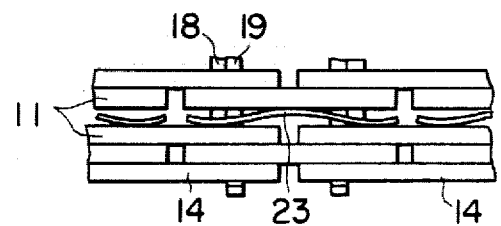
F I G. 15
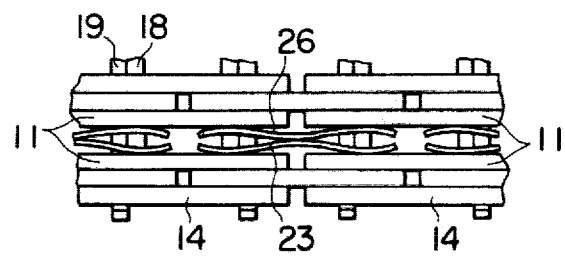
F I G. 16
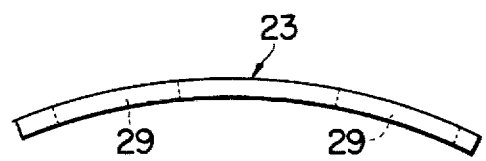
F I G. 17
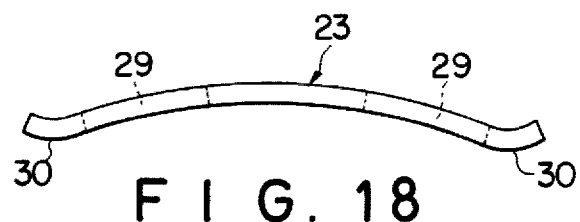
F I G. 18
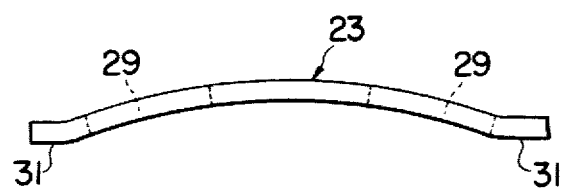

CHAIN DRIVE ASSEMBLY

This is a continuation of application Ser. No. 044,186, filed May 31, 1979, now abandoned.

BACKGROUND OF THE INVENTION

1. Field of the Invention

This invention relates to a chain drive assembly, and more particularly to a silent chain for transmitting a drive power from a fluid type torque converter of an automatic transmission to an auxiliary transmission.

2. Description of the Prior Art

A drive power transmitting mechanism incorporating a silent chain has suffered from noise during transmission of a drive power, which noise is principally caused by two factors: one is an elastic vibration sound resulting from a shock upon meshing of a chain with sprockets (a sound of meshing); and the other is a resonant sound developed as a result that a shock upon meshing of a chain with sprockets is increased by oscillation of the chain stringer. The first factor may be eliminated by correcting a sprocket tooth configuration properly to lower a shock upon meshing between the chain and sprockets. In order to eliminate oscillation of the chain stringer which constitutes the second factor, it is effective to use an anti-oscillation member, such as a tension member or a chain guide. However, such anti-oscillation member requires a considerable space for installation, needs fine adjustment of a gap between the member and the chain, suffers wear and the accompanied dust or the like which would impose an undesirable influence on other functional portions of a chain drive assembly, and is costly to manufacture.

As other countermeasures against the second factor, a system has been proposed, of eliminating a clearance between link plates, so as to provide a resistance to the bending movement of the chain, thereby preventing oscillation of the chain stringer. With such a system, an increase in component is avoided unlike the case where an anti-oscillation member is employed, and yet, a resistance to the bending movement of the chain largely changes even by a small difference in thickness between link plates, and by swelling. Such a system has accordingly failed to provide a proper and constant bending-resistance value, and suffered from the accommodation of one link plate to the other and accelerated wear during the service of the chain, which would lead to a lowered frictional resistance and eventually make the system useless.

SUMMARY OF THE INVENTION

It is accordingly an object of the present invention to provide a silent chain, which is free of the drawbacks described, and wherein oscillation of the chain stringer is successfully prevented, for reduction of noise.

According to the present invention, link plates are urged in the overlapped portions thereof in the axial direction of link pins by means of press members. Consequently, a clearance between the overlapped portions of link plates is eliminated to increase a frictional resistance between link plates, thus providing an increased resistance to the bending movement of the silent chain. The oscillation of the chain stringer is thus suppressed, and hence noise resulting therefrom is eliminated.

A device for preventing oscillation of the chain stringer according to the present invention does not require any special space, unlike a tension unit or a chain guide, and provides a fixed contact frictional force between plates in the event that such link plates are worn. Use of spring means having a non-linear spring constant minimizes a time-dependent variation in contact frictional force between link plates, irrespective of a degree of wear of each link plate during the service of the chain. This device is fit for use in suppression of oscillation of the chain stringer.

The spring means incorporated into the chain drive assembly act to prevent vibration of link plates themselves, whereas a shock upon meshing of the chain with sprockets is suppressed.

According to the present invention, a single leaf spring urges the link plates in the peripheral portions of two pinned points thereof which are spaced apart from each other in the longitudinal direction of the chain. The number of spring means necessary for the chain drive assembly is eliminated, with an improved assembly efficiency as well as an improved operational efficiency.

Respective leaf springs present an arcuate profile having a fixed curvature. Such a leaf spring is easy and less costly to manufacture.

Another leaf spring according to the present invention is curved at a given curvature in the mid portion thereof and has a small arc in each end portion thereof, which is curved opposite to the central curve thereof. Since the curved central portion of the leaf spring is maintained in engagement with a guide plate or a link plate, the contact surface pressure depends on a configuration or profile of a leaf spring and maintained at a proper value.

A leaf spring according to another embodiment of the present invention is curved at a given curvature in the mid-portion thereof and made linear in the opposite end portions, so as to eliminate contact surface pressure.

According to the present invention, the length of a leaf spring on a pitch circle of a sprocket is smaller than that of a link plate, such that an interference between the leaf spring and a sprocket is avoided, without a risk of the leaf spring being broken.

BRIEF DESCRIPTION OF THE DRAWINGS

FIGS. 11 through 14 show the positions of a leaf spring relative to the silent chain assembly, respectively;

FIG. 15 shows a further embodiment of the present invention;

FIGS. 16 through 18 illustrate various profiles of a leaf spring; respectively; and, FIG. 19 shows a dimensional relationship of a leaf spring to a link plate.

DESCRIPTION OF THE PREFERRED EMBODIMENTS

Figure 1:
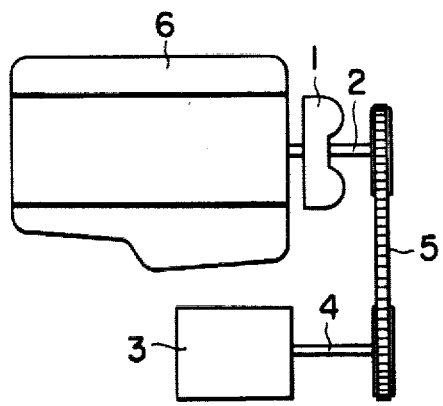
FIG. 1 is a schematic diagram illustrating arrangement of a silent chain in an automatic transmission.

Referring to FIG. 1, there are provided a fluid type torque converter 1 having an output shaft 2 and an auxiliary transmission 3 having an input shaft 4. Output shaft 2 and input shaft 4 extend in parallel to each other and are operatively connected to each other by means of a silent chain 5. A drive power of an engine 6 is thus transmitted by way of silent chain 5 to auxiliary transmission 3.

Figure 2:
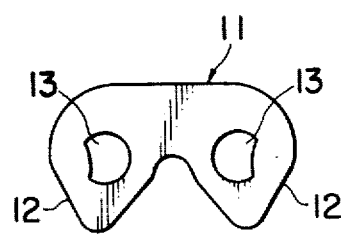
FIG. 2 is a front view of a link plate constituting the silent chain.

A link plate 11 has in the lower portion thereof tooth-shaped portions respectively having an outer flank 12 adapted to mesh with or engage a tooth of a sprocket, and an imperfect circular through-hole 13. Thus, both tooth-shaped portions are in mirror-image relation to each other, as a whole, with respect to the center line of the plate (FIG. 2).

Figure 3:
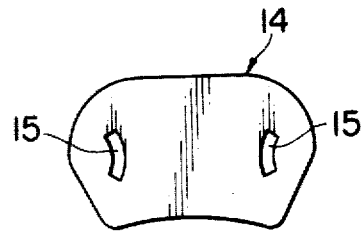
FIG. 3 is a front view of a guide plate.

A guide plate 14 has nearly sector-shaped slots 15 which are in mirror-image relation to each other with respect to the center line of the plate (FIG. 3).

Figure 4:
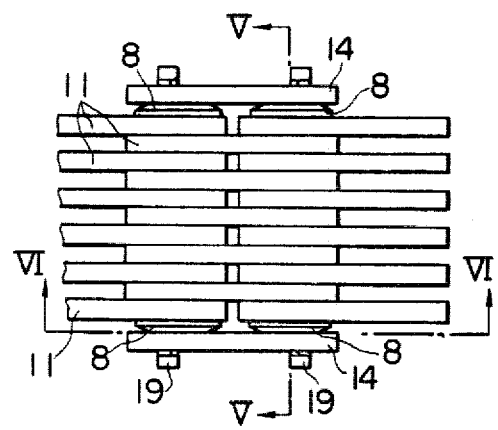
FIG. 4 is a fragementary view of the silent chain assembly according to the present invention.
Figure 5:
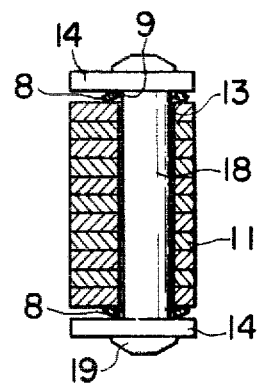
FIG. 5 is a transverse cross-sectional view taken along the line V—V of FIG. 4.
Figure 6:
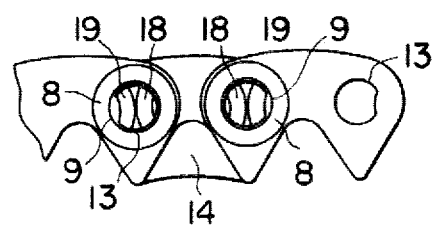
FIG. 6 is a longitudinal cross-sectional view taken along the line VI—VI of FIG. 4.

Referring to FIGS. 4 through 6 which show a first embodiment of the present invention, silent chain 5 comprises plural groups of link plates 11, each group consisting of two or more link plates. Link plates of one group are arranged adjacent to each other transversely of the chain and coupled at the opposite end portions to one ends of the link plates of the neighboring groups in an overlapped fashion by inserting link pins 18 and rivet pins 19 into holes 13 in each link plate. Dished disc springs 8 having a central circular hole 9 are interposed between link plates 11 positioned transversely outermost of the chain and guide plates 14, respectively. Each link pin 18 and each rivet pin 19 extend into circular hole 9 in each dished disc spring 8. It should be noted that each rivet pin 19 is closely fitted in respective hole 15 in each guide plate 14 placed at each longitudinal side of the chain, so as to provide a predetermined spring force to each dished disc spring 8.

Each dished disc spring 8 acts on the overlapped portions of link plates 11 to urge the link plates axially inward of link pin 18, so that a clearance between the overlapped portions of link plates is eliminated, with an increased frictional resistance between link plates 11, resulting in an increased resistance to the bending movement of the silent chain. Oscillation of the chain stringer is thus suppressed, and hence a noise due to such oscillation.

Figure 7:
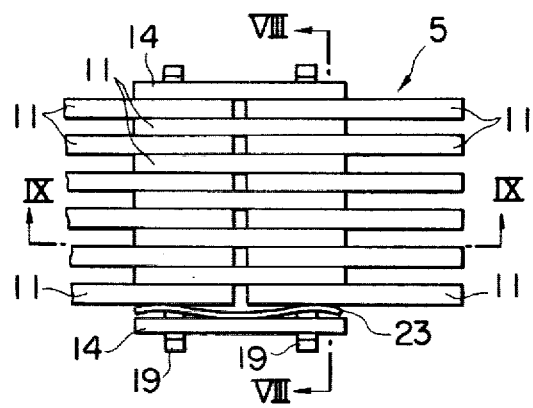
FIG. 7 is a fragmentary view of a silent chain assembly according to another embodiment of the present invention.
Figure 8:
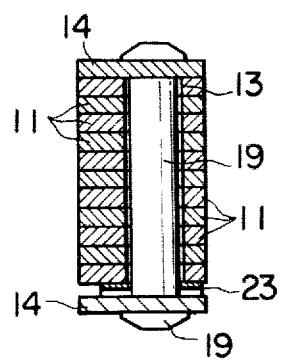
FIG. 8 is a transverse cross-sectional view taken along the line VII—VII of FIG. 7.
Figure 9:
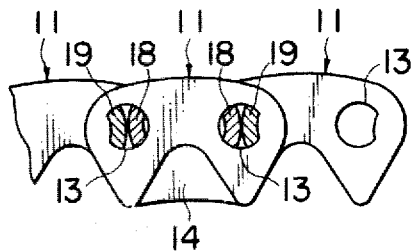
FIG. 9 is a longitudinal cross-sectional view taken along the line IX—IX of FIG. 7.

FIGS. 7 through 9 show another embodiment of the present invention. Silent chain 5 comprises plural groups of link plates 11, each group consisting of two or more link plates coincident with each other in the position in the longitudinal direction of the chain. Link plates 11 of one group are coupled at the opposite ends to one end of link plates 11 of the neighboring groups by inserting link pins 18 and rivet pins 19 into holes 13 in respective link plate. Each link pin 18 extends transversely of the chain from the link plate positioned outermost on one longitudinal side of the chain to the link plate positioned outermost on the other side thereof. On the other hand, each rivet pin 19 extends through the outermost link plates on both sides of the chain to pierce through holes 15 in guide plates 14 placed on the opposite sides of the chain and is crushed at the opposite ends thereof, so as not to be slipped therefrom.

In this embodiment, a leaf spring 23 is disposed between guide plate 14 and neighboring link plates 11 positioned transversely outermost of the chain in a manner to span between the neighboring link plates 11. Leaf spring 23 is in engagement with guide plate 14 at the mid portion thereof and with the neighboring outermost link plates 11 at the opposite ends thereof. Each dished disc spring is secured to the link plates, with its hole brought in register with one of holes 13 in each link plate. Leaf spring 23 is larger in length than a distance between two holes 13 provided in each link plate at a spacing from each other in the longitudinal direction thereof, so that the leaf spring may urges or press the opposite pinned portions of link plates 11 axially of rivet pin 19. The number of leaf spring 23, on the whole, of the silent chain 5 is eliminated, as compared with that of dished disc springs, with the saving in time of assembly. In this embodiment, leaf springs 23 and guide plates 14 are in coincidence with each other in the position in the longitudinal direction of the chain such that an improved assembly efficiency is provided.

Figure 10:
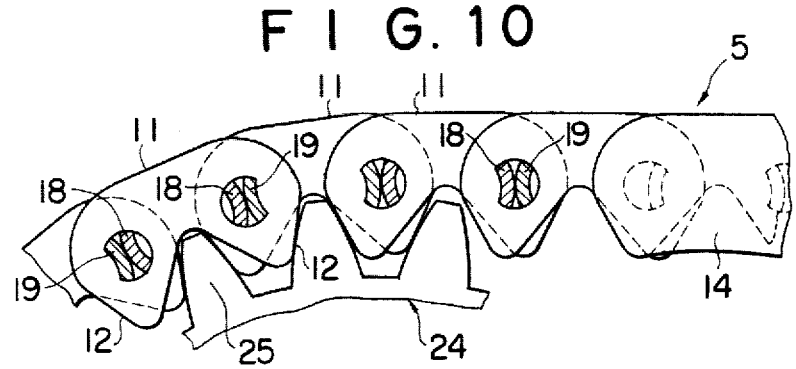
FIG. 10 is a side view of the silent chain sprockets arranged in a coacting relationship.

FIG. 10 shows silent chain 5 and a sprocket 24 which are in cooperative relation to each other, wherein flank 12 of one tooth-shaped portion of each link plate 11 is in contact with a tooth 25 of sprocket 24. Each leaf spring 23 acts on the overlapped portion of the neighboring link plates 11 to eliminate a clearance between the link plates, thereby providing an increased contact resistance between the link plates. The bending resistance of silent chain 5 is thus increased, such that oscillation of the chain stringer is suppressed, and a noise due to such oscillation is prevented accordingly.

Figure 11:
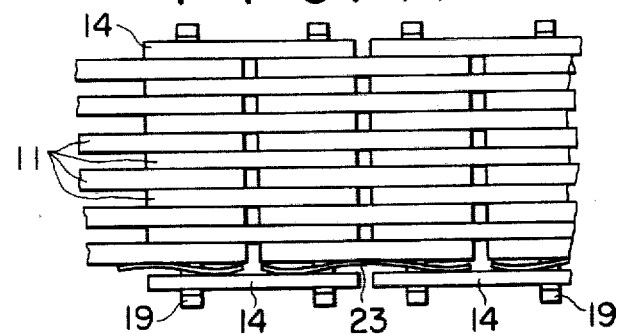

FIG. 11 shows a still further embodiment, wherein leaf spring 23 extends between neighboring guide plates 14. Leaf spring 23 is maintained, at the mid portion thereof, in engagement with the outermost link plate 11, and at the opposite ends thereof, in engagement with the neighboring guide plates, respectively. The leaf spring in this embodiment acts in like manner as that of FIG. 7 with the same results. In this embodiment, leaf spring 23 extends between the neighboring two guide plates 14 lined up with each other. This arrangement is advantageous for preventing interference between leaf spring 23 and sprocket 24.

Figure 12:
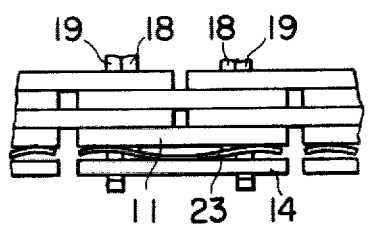

In the embodiment shown in FIG. 12, the outermost link plate 11 and guide plate 14 are positioned in coincidence with each other in the longitudinal direction of the chain, with leaf spring 23 interposed therebetween. In this embodiment, a relative movement of leaf spring 23 to link plate 11 or guide plate 14 is not caused. Leaf spring 23 in this embodiment enjoys its long service life, with freedom from wear.

Figure 13:
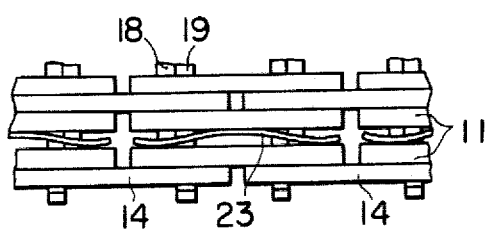

In the embodiment of FIG. 13, the outermost link plate and the second link plate as counted from the outside of the chain are placed in coincidence with each other in the longitudinal direction of the chain, with leaf springs 23 interposed therebetween. In the embodiment, relative movement of leaf spring 25 to the outermost link plate or the second link plate is prevented. This arrangement is effective for protecting leaf spring 23 against wear. Leaf spring 23 is positioned transversely inward of the silent chain. This arrangement is desirable from the lubrication and durability points of view.

In the embodiment of FIG. 14, leaf spring 23 is interposed between the second link plate as counted from the transversely outside of the chain and the third link plate in a manner that the mid portion thereof contacts the third link plate and the opposite ends thereof contact the second link plate. Leaf spring 23 in this embodiment is positioned nearer to the center line of the chain. This arrangement is desirable from the viewpoints of lubrication and durability of the leaf spring.

In the embodiment of FIG. 15, a pair of leaf springs 23 and 26 are disposed between the second link plates and the third link plates, in a manner that each pair of springs are in an opposed relation to each other, with the mid portions thereof maintained in contact with each other and with the opposite ends thereof maintained in contact with the second link plate and the third link plate, respectively, thus presenting symmetrical profile. Stress per leaf spring is eliminated and leaf springs 23 and 26 are positioned nearer to the center line of the chain, such that the improved lubrication and durability are provided for the leaf spring.

FIGS. 16 through 18 shows a variety of leaf springs different in profile. Respective leaf spring 23 has through-holes 29, both of which are symmetrical with respect to the center line of the spring, and into which are inserted link pin 18 and rivet pin 19. Leaf spring 23 shown in FIG. 16 has an arcuate profile having a given curvature; leaf spring 23 of FIG. 17 is curved in one direction in the central portion at a given curvature and curved in the direction opposite the one direction at each end thereof, thereby having a small arc portion 30 thereat; and leaf spring 23 of FIG. 18 is curved in the central portion at a given curvature to terminate at the linear opposite end portions 31. The leaf springs in FIGS. 17 and 18 bring the small arc portions 30 and linear end portions 31 into contact with link plate 11 or guide plate 14. The leaf spring of FIG. 16 is easy to manufacture. The leaf spring of FIG. 17 insures a constant contact surface pressure owing to the small arc portions 30, irrespective of a difference in size being incurred due to configuration. The leaf spring of FIG. 18 provides a descreased contact surface pressure owing to the linear end portions 31.

Figure 19:
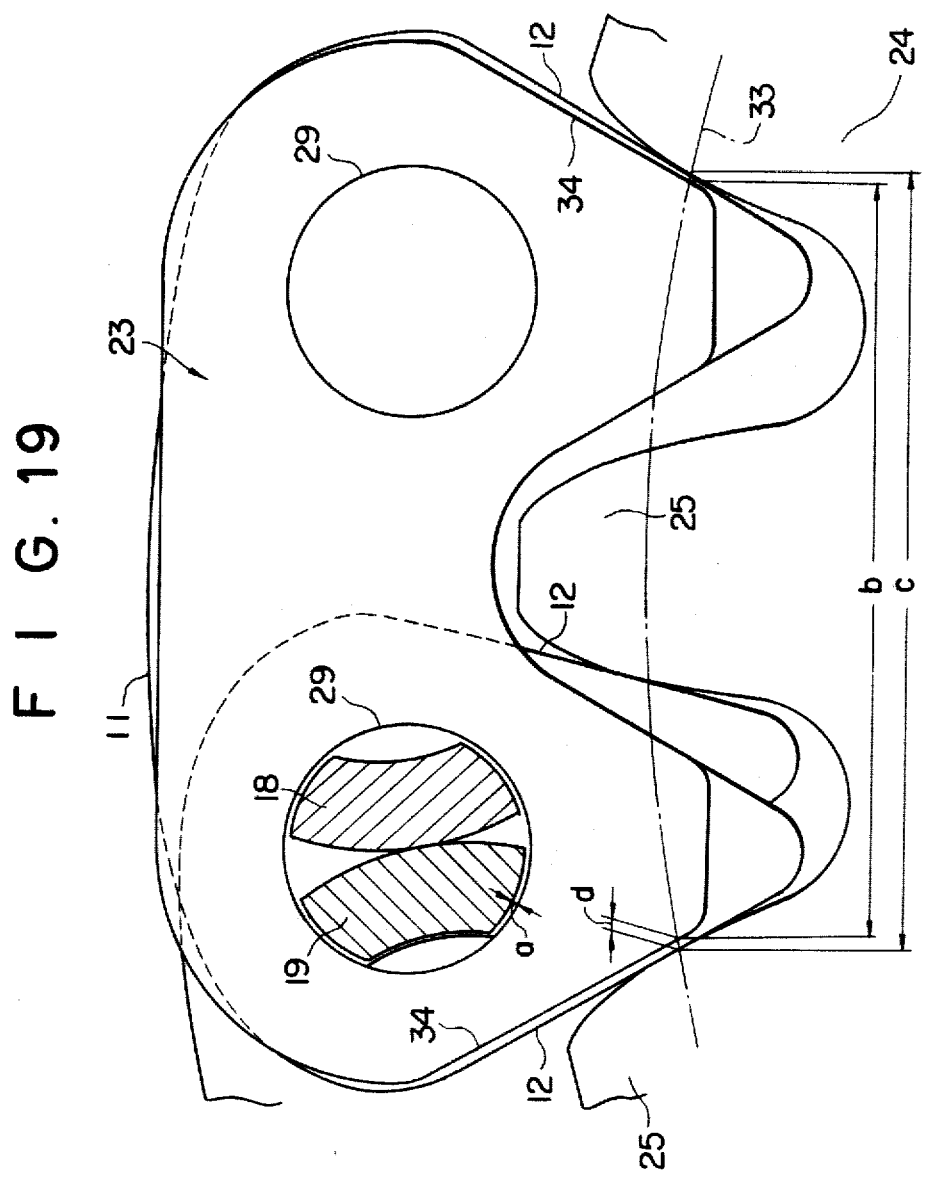

FIG. 19 is a front view of leaf spring 23 incorporated into the silent chain assembly. Leaf spring 23 has circular through-holes 29, into each of which link pin 18 and rivet pin 19 are inserted in a manner that a radial cap a is left between the inner diameter of hole 29 and the link pin or the rivet pin. Each side edge 34 of leaf spring 23 is deviated longitudinally inward of the silent chain from each flank 12 of link plate 11 positioned behind the leaf spring. More specifically, there is a difference 2d between an edge-to-edge distance b of the leaf spring on a pitch circle 33 of sprocket 24 and a flank-to-flank distance c of the tooth-shaped portions of link plate 11 positioned behind the leaf spring. Since d>a, then the interference between each side edge of leaf spring 23 and tooth 25 of sprocket 24 is avoided, without a risk that an excessive stress is created on leaf spring 23, which would lead to damaging the leaf spring.

What is claimed is:

1. In a silent chain for cooperative engagement with sprockets on a sprocket wheel, said chain including a plurality of plates the top and side edges of which are substantially identical in shape and dimension, said plates being arranged in transversely adjacent groups and said groups being longitudinally rotatably coupled by transverse pins forming said chain, the improvement comprising:

a curved leaf spring having top and side edges substantially conforming in shape to the top and side edges of said plates, said leaf spring having a pair of longitudinally adjacent holes and being secured by a longitudinally adjacent pair of said pins received in said holes for compression between transversely adjacent plates, said leaf spring being curved to provide a longitudinally central bow portion between said pins and being disposed coincident with at least one of said transversely adjacent plates so that said bow portion is in biasing contact with a corresponding longitudinally central portion of said coincident transversely adjacent plate, said leaf spring biasing said plates together in a direction axial of said pins, the length of said leaf spring on a pitch circle of said sprocket wheel being smaller than that of said plates and the diameter of said holes being greater than said pins to preclude contact by said leaf springs with said sprockets when said groups of plates engage said sprockets.

2. The silent chain of claim 1, wherein said leaf spring is disposed coincident with the plate transversely outermost of said chain.

3. The silent chain of claim 1, wherein said leaf spring is disposed coincident with the plate inwardly adjacent the plate transversely outermost of said chain.

4. The silent chain of claim 1, wherein said leaf spring is disposed coincident with both the plate transversely outermost of said chain and the plate inwardly adjacent with said outermost plate.

5. The silent chain of claim 1, wherein said leaf spring is disposed between adjacent plates inwardly of the plate transversely outermost of said chain and is coincident with one of said adjacent plates.

6. The silent chain of claim 1, wherein said leaf spring is disposed between adjacent plates inwardly of the plate transversely outermost of said chain and is coincident with both of said adjacent plates.

7. The silent of claim 1, wherein the longitudinal end of said leaf spring on each side of said bow portion is curved in a small arc in a direction opposite of said bow portion.

8. The silent chain of claim 1, wherein the longitudinal end of said leaf spring on each side of said bow portion is substantially planar.

9. A chain drive assembly for cooperation with a sprocket wheel having a plurality of link plate groups consisting respectively of at least two parallel link plates, guide plates disposed transversely outermost of the link plate groups, link pins rotatably connecting the link plates of longitudinally adjacent link plate groups to each other, and curved leaf springs pressing against the link plates in the axial direction of the link pins in the regions between two longitudinally adjacent pins, each leaf spring having at the middle portion a convexity with a predetermined curvature, characterized in that the leaf springs are so disposed that their middle convexities abut the middle of the transversely adjacent link plates or guide plates or abut against each other, and the contour form of the leaf springs approximately correspond to the contour form of the link plates, the length of each leaf spring on pitch circle of said sprocket wheel being smaller than the length of each link plate on the pitch circle.

10. The chain drive assembly as in claim 9 characterized in that the leaf springs are each arranged respectively between the outermost link plates and the adjacent guide plates.

11. The chain drive assembly as in claim 9 characterized in that the leaf springs are arranged between transversely adjacent link plates.

12. The chain drive assembly as in claim 10 characterized in that the outermost link plates and the guide plates having leaf spring therebetween are secured together by the same pair of link pins.

13. The chain drive assembly as in claim 10 characterized in that the outermost link plates and the guide plates having leaf spring therebetween are longitudinally offset with respect to each other.

14. The chain drive assembly as in claim 11 wherein the transversely adjacent link plates having the leaf spring therebetween are secured together by the same pair of link pins.

15. The chain drive assembly as in claim 11 characterized in that the transversely adjacent link plates having the leaf springs therebetween are longitudinally offset with respect to each other.

16. The chain drive assembly as in claim 9 characterized in that each leaf spring has at both ends a small bow portion which is curved in a direction opposite that of the middle convexity portion.

* * * * *